(12) United States Patent
Hodgson et al.

(10) Patent No.: US 11,466,479 B2
(45) Date of Patent: Oct. 11, 2022

(54) VEHICLE INTERIOR COMPONENT

(71) Applicant: Shanghai Yanfeng Jinqiao Automotive Trim Systems Co. Ltd., Novi, MI (US)

(72) Inventors: Thomas Scott Hodgson, Holland, MI (US); Tamanna Nabar, Grand Rapids, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 17/383,964

(22) Filed: Jul. 23, 2021

(65) Prior Publication Data

US 2021/0348425 A1 Nov. 11, 2021

Related U.S. Application Data

(63) Continuation of application No. PCT/US2021/021057, filed on Mar. 5, 2021.

(Continued)

(51) Int. Cl.
*E05B 77/12* (2014.01)
*B60R 7/04* (2006.01)
(Continued)

(52) U.S. Cl.
CPC ............... *E05B 77/12* (2013.01); *B60R 7/04* (2013.01); *E05B 83/32* (2013.01); *E05C 3/02* (2013.01);
(Continued)

(58) Field of Classification Search
CPC .......... E05B 77/12; E05B 83/32; E05B 77/42; E05B 77/06; E05C 3/02; B60R 7/04; Y10T 292/11; B60N 2/793
See application file for complete search history.

(56) References Cited

U.S. PATENT DOCUMENTS 2,873,794 A 2/1959 Leslie et al.
3,621,510 A 11/1971 Rollins, Jr.
(Continued)

FOREIGN PATENT DOCUMENTS

DE 4130847 C2 4/1995
DE 20311467 U1 9/2003
(Continued)

OTHER PUBLICATIONS

International Search Report and Written Opinion from the International Searching Authority for International Patent Application No. PCT/US2018/040325 dated Sep. 21, 2018 (in English) (11 pages).

(Continued)

*Primary Examiner* — Christine M Mills
*Assistant Examiner* — Faria F Ahmad

(57) ABSTRACT

A vehicle interior component is disclosed. The component may comprise a cover moveable relative to a base and a latch mechanism to provide an unlatched state for the cover and a latched state when actuated by an external/inertia force (e.g. in an event such as a rollover). The latch mechanism may comprise a latch/member extending through an opening in the cover into the base when the cover is closed and retracted into the cover when the cover is open. When the cover is closed, the latch mechanism may provide an unlatched state with the latch in an intermediate position (for an occupant's ordinary use) and a latched state with the latch fully extended to engage a catch in the base (upon the event providing the external force to prevent the cover opening). The component may comprise a console providing a storage compartment or an armrest.

19 Claims, 10 Drawing Sheets

Related U.S. Application Data

(60) Provisional application No. 62/993,213, filed on Mar. 23, 2020.

(51) Int. Cl.
*E05B 83/32* (2014.01)
*E05C 3/02* (2006.01)
*E05B 77/42* (2014.01)
*E05B 77/06* (2014.01)

(52) U.S. Cl.
CPC ............... *E05B 77/06* (2013.01); *E05B 77/42* (2013.01); *Y10T 292/11* (2015.04)

(56) References Cited

U.S. PATENT DOCUMENTS

| | | | |
|---|---|---|---|
| 4,052,093 A | 10/1977 | Fattori | |
| 4,579,384 A | 4/1986 | Sharod | |
| 4,906,044 A * | 3/1990 | Wilstermann | B60N 2/793 |
| | | | 292/252 |
| 5,116,099 A | 5/1992 | Kwasnik et al. | |
| 5,476,307 A | 12/1995 | Whalen | |
| 5,658,043 A | 8/1997 | Davidson | |
| 6,616,206 B2 | 9/2003 | Luginbill et al. | |
| 6,736,438 B1 | 5/2004 | Wieclawski | |
| 6,802,550 B1 * | 10/2004 | Griggs, Jr. | E05B 83/32 |
| | | | 292/136 |
| 6,808,214 B2 | 10/2004 | Sato et al. | |
| 6,843,528 B2 * | 1/2005 | Glynn | B60N 2/793 |
| | | | 297/411.3 |
| 7,097,220 B2 | 8/2006 | Haba | |
| 7,481,468 B2 | 1/2009 | Merideth et al. | |
| 7,581,774 B2 | 9/2009 | Abro et al. | |
| 7,607,727 B2 | 10/2009 | Park | |
| 7,614,674 B2 | 11/2009 | Shiono et al. | |
| 7,793,995 B2 | 9/2010 | King et al. | |
| 7,845,701 B2 | 12/2010 | Müller | |
| 8,104,817 B2 | 1/2012 | Kayser et al. | |
| 8,123,261 B2 | 2/2012 | Kikuchi et al. | |
| 8,167,348 B2 | 5/2012 | Fesenmyer | |
| 8,191,953 B2 | 6/2012 | Simon et al. | |
| 8,215,684 B2 | 7/2012 | Whitens et al. | |
| 8,449,001 B2 | 5/2013 | Whitens et al. | |
| 8,727,399 B2 | 5/2014 | Russell et al. | |
| 8,961,062 B2 | 2/2015 | Gillis et al. | |
| 9,308,843 B2 * | 4/2016 | Pichler-Wilhelm | B60N 2/78 |
| 9,415,710 B2 | 8/2016 | Simon et al. | |
| 9,469,225 B1 | 10/2016 | Salenbien et al. | |
| 9,523,222 B2 | 12/2016 | Zhang et al. | |
| 9,637,032 B2 | 5/2017 | Salenbien et al. | |
| 9,637,060 B2 | 5/2017 | Gaudig | |
| 9,713,972 B2 | 7/2017 | Bozio et al. | |
| 9,714,530 B2 * | 7/2017 | Amick | E05B 77/12 |
| 9,714,531 B2 | 7/2017 | Vigneau et al. | |
| 9,771,027 B2 | 9/2017 | Neumann et al. | |
| 9,771,743 B2 | 9/2017 | Roychoudhury et al. | |
| 10,112,510 B2 | 10/2018 | Purves et al. | |
| 10,189,390 B2 | 1/2019 | Gillis et al. | |
| 10,352,071 B2 | 7/2019 | Muntean et al. | |
| 10,391,904 B2 | 8/2019 | Aktas et al. | |
| 10,486,568 B2 | 11/2019 | Davis | |
| 10,518,711 B2 * | 12/2019 | Bokulic | E05B 83/32 |
| 10,717,390 B2 * | 7/2020 | Anderson | E05B 83/32 |
| 10,737,628 B2 | 8/2020 | Anderson et al. | |
| 2002/0171251 A1 | 11/2002 | Bieck et al. | |
| 2004/0084948 A1 * | 5/2004 | Glynn | B60N 2/793 |
| | | | 297/411.2 |
| 2004/0201238 A1 | 10/2004 | Griggs, Jr. et al. | |
| 2008/0129101 A1 | 6/2008 | Park | |
| 2010/0213729 A1 * | 8/2010 | Spitler | B60N 3/101 |
| | | | 296/1.08 |
| 2012/0001447 A1 | 1/2012 | Simon et al. | |
| 2013/0106121 A1 | 5/2013 | Hasegawa | |
| 2014/0003864 A1 | 1/2014 | Gillis et al. | |
| 2015/0197966 A1 | 7/2015 | Regnault et al. | |
| 2015/0315824 A1 | 11/2015 | Gotzen et al. | |
| 2015/0354250 A1 | 12/2015 | Bendel et al. | |
| 2016/0052428 A1 * | 2/2016 | Hessdörfer | B60N 2/753 |
| | | | 297/411.32 |
| 2017/0074005 A1 * | 3/2017 | Amick | E05B 77/12 |
| 2017/0145720 A1 | 5/2017 | Roychoudhury | |
| 2017/0159328 A1 | 6/2017 | Roychoudhury et al. | |
| 2017/0267134 A1 | 9/2017 | Anderson et al. | |
| 2018/0009387 A1 * | 1/2018 | Kwon | B60N 2/773 |
| 2018/0222371 A1 * | 8/2018 | Nothroff | B60N 2/753 |
| 2018/0371808 A1 * | 12/2018 | Yano | E05B 83/32 |
| 2019/0136592 A1 | 5/2019 | Muntean et al. | |
| 2019/0381941 A1 * | 12/2019 | Fukui | B60N 2/793 |
| 2020/0207277 A1 | 7/2020 | Anderson et al. | |
| 2021/0146847 A1 * | 5/2021 | Fukui | B60R 7/04 |
| 2021/0237654 A1 * | 8/2021 | Kujira | E05B 83/32 |

FOREIGN PATENT DOCUMENTS

| | | |
|---|---|---|
| DE | 20221460 U1 | 2/2006 |
| DE | 10009291 B4 | 6/2006 |
| DE | 102008030387 A1 | 1/2009 |
| DE | 102010023731 A1 | 12/2011 |
| DE | 102008000802 B4 | 5/2012 |
| DE | 102011053395 A1 | 3/2013 |
| DE | 202012010950 U1 | 2/2014 |
| DE | 102014103792 A1 | 9/2015 |
| DE | 102014009465 A1 | 12/2015 |
| DE | 202016105434 U1 | 11/2016 |
| DE | 102015104722 B4 | 5/2017 |
| DE | 102016200052 A1 | 7/2017 |
| DE | 202017104655 U1 | 8/2017 |
| DE | 102017111240 A1 | 12/2017 |
| DE | 102017111259 A1 | 12/2017 |
| DE | 102016214520 A1 | 2/2018 |
| DE | 102014009465 B4 | 2/2019 |
| DE | 102018205916 A1 | 10/2019 |
| EP | 0525811 A1 | 2/1993 |
| EP | 1660743 B1 | 2/2007 |
| EP | 1926633 B1 | 9/2009 |
| EP | 2133495 B1 | 11/2012 |
| EP | 2798137 A1 | 11/2014 |
| EP | 2897837 A1 | 7/2015 |
| EP | 3187367 A1 | 7/2017 |
| EP | 3027830 B1 | 2/2018 |
| EP | 3361909 A1 | 8/2018 |
| EP | 3299216 B1 | 2/2020 |
| KR | 101209605 B1 | 12/2012 |
| WO | 2009115347 A1 | 9/2009 |
| WO | 2018024722 A1 | 2/2018 |
| WO | 2019010086 A1 | 1/2019 |
| WO | 2019213487 A1 | 11/2019 |

OTHER PUBLICATIONS

International Search Report and Written Opinion from the International Searching Authority for International Patent Application No. PCT/US2019/030556 dated Jul. 29, 2019 (in English) (12 Pages).
International Search Report and Written Opinion from the International Searching Authority for International Patent Application No. PCT/US2021/021057 dated May 25, 2021 (in English) (10 Pages).

* cited by examiner

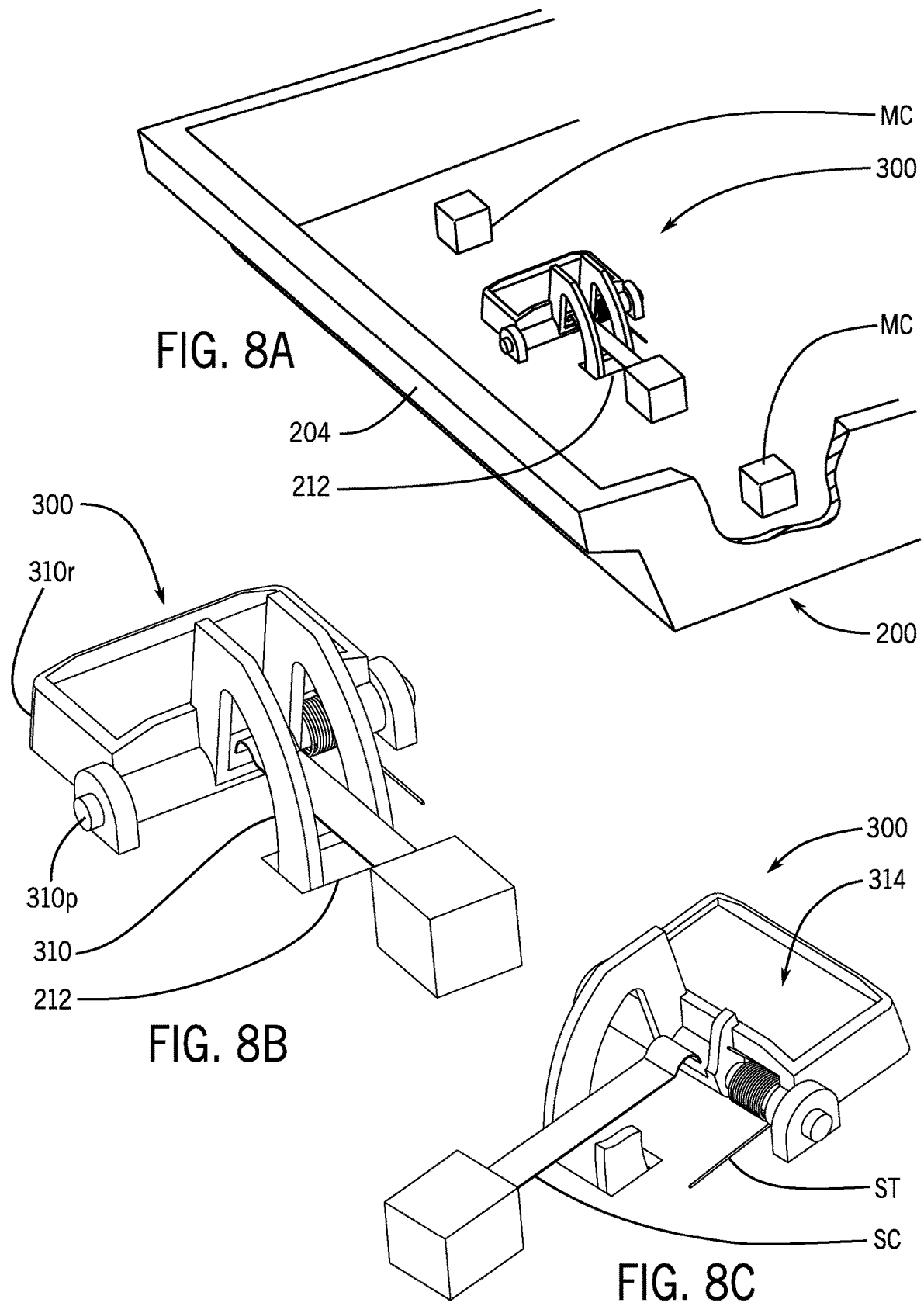

VEHICLE INTERIOR COMPONENT

CROSS-REFERENCE TO RELATED APPLICATIONS

The present application is a continuation of PCT/International Patent Application No. PCT/US2021/021057 titled "VEHICLE INTERIOR COMPONENT" filed Mar. 5, 2021, which claims benefit of U.S. Provisional Patent Application No. 62/993,213 titled "VEHICLE INTERIOR COMPONENT" filed Mar. 23, 2020.

The present application claims priority to and incorporates by reference in full the following patent applications: (a) U.S. Provisional Patent Application No. 62/993,213 titled "VEHICLE INTERIOR COMPONENT" filed Mar. 23, 2020; (b) PCT/International Patent Application No. PCT/US2021/021057 titled "VEHICLE INTERIOR COMPONENT" filed Mar. 5, 2021.

FIELD

The present invention relates to a vehicle interior component.

BACKGROUND

It is known to provide a vehicle interior component comprising a base with a bin and a cover movable relative to the base to facilitate access to the bin. It is also known to provide a vehicle interior component configured to lock or latch in response to an inertia force such as applied in a rollover event.

It would be advantageous to provide an improved vehicle interior component configured for improved functionality and operation comprising features (and combinations of features) as shown and described in the present application including but not limited to an improved latch mechanism configured to be actuated by an external/inertia force (such as applied in an event experienced by the vehicle).

SUMMARY

The present invention relates to a vehicle interior component comprising a base, a cover configured to move relative to the base between a closed position and an open position and a latch mechanism configured to provide an unlatched state for the cover and a latched state for the cover. The latch mechanism may be configured to provide the latched state when actuated by an inertia force. The cover may comprise a wall comprising an opening. The latch mechanism may be configured to protrude through the opening of the wall of the cover when the cover is in the closed position. The cover may comprise the latch mechanism. The latch mechanism may be configured to extend from the cover when the cover is in the closed position. The latch mechanism may be configured to form a generally continuous surface with the wall of the cover when the cover is in the open position. The latch mechanism may be configured to rotate relative to the base to engage the base. The latch mechanism may comprise a bar configured to rotate into engagement with the base in the latched state.

The present invention relates to a vehicle interior component comprising a base, a cover configured to move relative to the base between a closed position and an open position and a latch mechanism configured to provide an unlatched state for the cover and a latched state for the cover. The latch mechanism may be configured to provide the latched state when actuated by an inertia force. The cover may be configured to rotate in an opening direction relative to the base between the closed position and the open position. The latch mechanism may be configured to rotate relative to the base in a direction generally orthogonal to the opening direction. The latch mechanism may comprise a bar configured to engage the base in the latched state. The bar of the latch mechanism may be configured to rotate into engagement with the base in the latched state. The component may comprise a counterweight configured to provide mass to move the bar toward engagement with the base. The component may comprise a spring mechanism configured to at least one of (a) bias the bar in the unlatched state; (b) move the bar in response to removal of the inertia force. The bar of the latch mechanism may be configured to provide a gap with the base in the latched state. The latch mechanism may be configured to close the gap to prevent the cover from moving to the open position.

The present invention relates to a vehicle interior component comprising a base, a cover configured to move relative to the base between a closed position and an open position and a latch mechanism configured to provide an unlatched state for the cover and a latched state for the cover. The latch mechanism may be configured to provide the latched state when actuated by an inertia force. The latch mechanism may comprise a latch configured to move between a retracted position and an extended position through an intermediate position. The latch may be configured to move from the intermediate position toward the retracted position when the cover moves from the closed position toward the open position. The latch may comprise a curved member configured to engage the base in the latched state. The latch may be configured to move from the intermediate position toward the extended position in response to the inertia force. The cover may be configured for movement from (a) the unlatched state with the cover in the closed position and the latch in the intermediate position to (b) a transition state with the latch in the fully extended position to (c) the latched state with the cover in the closed position and the latch in the extended position. The latch mechanism may be configured to provide a gap with the base in the transition state. The cover may be configured to move through the gap to contact the base in the latched state. The component may comprise at least one of (a) a console; (b) a center console; (c) a floor console; (d) an armrest.

The present invention relates to a vehicle interior component comprising a base; a cover configured to move relative to the base between a closed position and an open position; and a latch mechanism configured to provide an unlatched state for the cover and a latched state for the cover. The latch mechanism may be configured to provide the latched state when actuated by an inertia force. The cover may comprise the latch mechanism. The latch mechanism may be configured to extend from the cover when the cover is in the closed position. The cover may comprise a wall comprising an opening; the latch mechanism may be configured to form a generally continuous surface with the wall of the cover when the cover is in the open position. The cover may comprise a wall comprising an opening; the latch mechanism may be configured to protrude through the opening of the wall of the cover when the cover is in the closed position. The latch mechanism may be configured to rotate relative to the base to engage the base. The cover may be configured to rotate in an opening direction relative to the base between the closed position and the open position; the latch mechanism may be configured to rotate relative to the base in a direction generally orthogonal to the opening direction. The latch mechanism may comprise a bar configured to engage the base in the latched state. The bar of the latch mechanism may be configured to engage a flange of the base in the latched state. The bar of the latch mechanism may be configured to rotate into engagement with the base in the latched state. The component may comprise a counterweight configured to provide mass to move the bar toward engagement with the base. The component may comprise a spring mechanism configured to at least one of (a) bias the bar in the unlatched state; (b) move the bar in response to removal of the inertia force. The bar of the latch mechanism may be configured to provide a gap with the base in the latched state. The gap may be configured to be closed to prevent the cover from moving to the open position. The latch mechanism may comprise a latch configured to move between a retracted position and an extended position through an intermediate position. The latch may comprise a curved member configured to engage the base in the latched state. The latch may be configured to move from the intermediate position toward the retracted position when the cover moves from the closed position toward the open position. The latch may be configured to move from the intermediate position toward the extended position in response to the inertia force. The cover may be configured for movement from (a) the unlatched state with the cover in the closed position and the latch in the intermediate position to (b) a transition state with the latch in the fully extended position to (c) the latched state with the cover in the closed position and the latch in the extended position. The component may comprise a gap between the latch mechanism and the base in the transition state. The cover may be configured to move through the gap to contact the base in the latched state. The cover may be configured to pivot relative to the base between the closed position and the open position. The component may comprise at least one of (a) a console; (b) a center console; (c) a floor console; (d) an armrest.

The present invention relates to a component for an interior of a vehicle of a type that may be subjected to an external force in an event such as a rollover of the vehicle comprising a base; a cover movable between a closed position and an open position relative to the base; and a latch mechanism configured to provide a latched state to secure the cover in the closed position relative to the base; so that when the vehicle is subjected to the external force the latch mechanism may be configured to actuate to the latched state to secure the cover in the closed position relative to the base. The latch mechanism may comprise a latch in the cover. The latch may be configured to be retracted when the cover is in the open position. The latch may be configured to be partially extended when the cover is in the closed position. The latch mechanism may comprise the latch in the cover and a catch in the base. The catch in the base may comprise a plate; the latch of the latch mechanism may be configured to provide a gap with the plate in the latched state. The latch mechanism may comprise a latch configured to provide a retracted position and an extended position. Upon the event for the vehicle when the cover is in the closed position the latch may be actuated to the extended position. The latch mechanism may be configured to move the latch to the retracted position when the cover is moved toward the open position. The latch may be configured to provide an intermediate position between the extended position and the retracted position. The latch may be partially extended from the cover when in the intermediate position. When the cover is in the closed position the latch may be in the intermediate position. When the latch is in the intermediate position the cover may be moved toward the open position relative to the base. The latch may be configured to move to the intermediate position when the cover is moved to the closed position. The latch may be configured to rotate into the intermediate position when the cover is moved to the closed position. The component may comprise a spring; the latch may be configured to move to the intermediate position by operation of the spring. The latch mechanism may comprise a magnet arrangement. The magnet arrangement may comprise a magnet in the base and a magnet in the cover. The magnet in the base may be configured to provide magnetic repulsion to the magnet in the cover. The magnet arrangement may be configured to retain a latch of the latch mechanism in an intermediate position between a retracted position and an extended position. The magnet arrangement may be configured to move the latch toward a retracted position. The latch mechanism may comprise a counterweight; the latch mechanism may be configured to actuate from an unlatched state to the latched state when the event for the vehicle provides an inertia force on the counterweight. The latch mechanism may comprise a latch and a spring configured to move the latch toward a retracted position. The spring may be configured to move the latch to the retracted position when the cover is moved from the closed position toward the open position. The spring may comprise a torsion spring. The latch mechanism may comprise a magnet arrangement configured to compress the torsion spring. The latch mechanism may comprise a latch and a spring configured to move the latch to an intermediate position between an extended position and a retracted position. The spring may comprise at least one of (a) a beam spring; (b) a cantilever spring; (c) a stop; (d) a cam surface configured to engage a cam surface for the latch. The component may comprise a magnet arrangement configured to bias the latch against the spring. The spring may comprise a stop for the magnet arrangement.

The present invention relates to a vehicle interior component comprising a base; a cover configured to move relative to the base between a closed position and an open position; and a latch mechanism configured to provide an unlatched state for the cover and a latched state for the cover. The latch mechanism may be configured to provide the latched state when actuated by an inertia force. The cover may comprise the latch mechanism. The latch mechanism may be configured to extend from the cover when the cover is in the closed position. The cover may comprise a wall comprising an opening; the latch mechanism may be configured to form a generally continuous surface with the wall of the cover when the cover is in the open position. The cover may comprise a wall comprising an opening; the latch mechanism may be configured to protrude through the opening of the wall of the cover when the cover in in the closed position. The latch mechanism may be configured to rotate relative to the base to engage the base. The cover may be configured to rotate in an opening direction relative to the base between the closed position and the open position; the latch mechanism may be configured to rotate relative to the base in a direction generally orthogonal to the opening direction. The latch mechanism may comprise a bar configured to engage the base in the latched state. The bar of the latch mechanism may be configured to engage a flange of the base in the latched state. The bar of the latch mechanism may be configured to rotate into engagement with the base in the latched state. The bar of the latch mechanism may be configured to provide a gap with the base in the latched state. The gap may be configured to be closed to prevent the cover from moving to the open position. The component may comprise a counterweight configured to provide mass to move the bar toward engagement with the base. The component may comprise a spring mechanism configured to at least one of (a) bias the bar in the unlatched state; (b) move the bar in response to removal of the inertia force. The latch mechanism may comprise a latch configured to move between a retracted position and an extended position through an intermediate position. The latch may comprise a curved member configured to engage the base in the latched state. The latch may be configured to move from the intermediate position toward the retracted position when the cover moves from the closed position toward the open position. The latch may be configured to move from the intermediate position toward the extended position in response to the inertia force. The cover may be configured for movement from (a) the unlatched state with the cover in the closed position and the latch in the intermediate position to (b) a transition state with the latch in the fully extended position to (c) the latched state with the cover in the closed position and the latch in the fully extended position. The component may comprise a gap between the latch mechanism and the base in the transition state. The cover may be configured to move through the gap to contact the base in the latched state. The cover may be configured to pivot relative to the base between the closed position and the open position. The component may comprise at least one of (a) a console; (b) a center console; (c) a floor console; (d) an armrest.

The present invention relates to a component for an interior of a vehicle of a type that may be subjected to an external force in an event such as a rollover of the vehicle comprising a base; a cover movable between a closed position and an open position relative to the base; and a latch mechanism configured to provide a latched state to secure the cover in the closed position relative to the base; so that when the vehicle is subjected to the external force the latch mechanism may be configured to actuate to the latched state to secure the cover in the closed position relative to the base. The latch mechanism may comprise a latch in the cover. The latch may comprise a retractable latch. The latch may be configured to be retracted when the cover is in the open position. The latch may be configured to be partially extended when the cover is in the closed position. The latch may be configured to be extended to provide the latched state. The latch may be configured to be extended to provide the latched state when subjected to the event. The latch mechanism may comprise the latch in the cover and a catch in the base. The latch may be configured to be extended to engage the catch for the latched state. The catch may comprise a bracket. The catch in the base may comprise a plate; the latch of the latch mechanism may be configured to provide a gap with the plate in the latched state. The latch mechanism may be configured to provide an unlatched state. The latch mechanism may comprise a latch configured to provide a retracted position and an extended position. The latch may be within the cover when in the retracted position. The latch may be configured to provide an intermediate position between the extended position and the retracted position. The latch may be partially extended from the cover when in the intermediate position. When the cover is in the closed position the latch may be in the intermediate position. When the latch is in the intermediate position the cover may be moved toward the open position relative to the base. Upon the event for the vehicle when the cover is in the closed position the latch may be actuated to the extended position. The latch mechanism may be configured to move the latch to the retracted position when the cover is moved toward the open position. The latch mechanism may comprise a magnet arrangement. The magnet arrangement may comprise a magnet in the base. The magnet arrangement may comprise a magnet in the cover. The magnet arrangement may comprise a magnet in the base and a magnet in the cover; the magnet in the base may be configured to provide magnetic repulsion to the magnet in the cover. The magnet in the cover may comprise a magnet of a polarity and the magnet of the base may comprise a magnet of a polarity; so that the magnet of the cover may provide a repulsive force with the magnet of the base. The polarity of the magnet of the cover may be the same as the polarity of the magnet of the base. The magnet arrangement may be configured to retain a latch of the latch mechanism in an intermediate position between a retracted position and an extended position. The magnet arrangement may be configured to move the latch toward the extended position. The latch mechanism may comprise a counterweight; the latch mechanism may be configured to actuate from an unlatched state to the latched state when the event for the vehicle provides an inertia force on the counterweight. In the event the external force may comprise an inertia force. The component may comprise a hinge mechanism for the cover. The latch mechanism may comprise a latch and a spring configured to move the latch toward a retracted position. The spring may comprise a torsion spring. The latch mechanism may comprise a magnet arrangement configured to compress the torsion spring. The latch mechanism may comprise a latch and a spring configured to move the latch to an intermediate position between an extended position and a retracted position. The spring may comprise at least one of (a) a beam spring; (b) a cantilever spring; (c) a stop; (d) a cam surface configured to engage a cam surface for the latch. The component may comprise a magnet arrangement configured to bias the latch against the spring. The spring may comprise a stop for the magnet arrangement. The latch may comprise a hook. The latch may comprise a pivoting hook. When the cover is in the closed position and the latch mechanism is in the unlatched state, the magnet arrangement may be configured to provide a repulsive force to bias the latch against the beam spring. When the cover is moved to the closed position the latch of the latch mechanism may be configured to move to the intermediate position. The torsion spring may be configured to move the latch to the retracted position when the cover is moved from the closed position toward the open position. When the cover is in the open position and the latch mechanism is in the unlatched state, the latch may be in the retracted position. When the cover is in the closed position during the event the latch mechanism may be configured to move to the latched state with the latch in the extended position. The latch may be configured to engage the catch in the extended position. The latch may be configured to move to the intermediate position by operation of the torsion spring. The latch mechanism may comprise a counterweight configured to move the latch from the intermediate position to the extended position when the external force of an event is applied. The latch may comprise an arm providing the counterweight. The latch may comprise a hook. The latch may comprise a pivot. The latch may be configured to rotate from the extended position to the retracted position. The latch may be configured to engage a beam spring when in the intermediate position. The latch may be configured to engage a catch when in the extended position. The latch may be configured to disengage the catch when in the intermediate position. The catch may comprise a plate. The catch may comprise an opening. The catch may comprise a surface configured to engage the latch. The latch may be configured to be retracted within a profile of the cover when in the retracted position. The latch may be configured to be flush with a bottom of the cover when in the retracted position. The latch may be configured to rotate into the intermediate position when the cover is moved to the closed position. The latch may be disengaged with the catch when in the intermediate position.

FIGURES

FIGS. 8A to 8C are schematic partial perspective views of a vehicle interior component shown as a console assembly according to an exemplary embodiment.

TABLES

TABLE A indicates a mode of operation for a vehicle interior component with a latch mechanism and a cover movable relative to a base according to an exemplary embodiment.

TABLE B indicates a mode of operation for a vehicle interior component with a latch mechanism and a cover movable relative to a base according to an exemplary embodiment.

TABLE C indicates a mode of operation for a vehicle interior component with a latch mechanism and a cover movable relative to a base according to an exemplary embodiment.

DESCRIPTION

As shown schematically according to an exemplary embodiment in FIGS. 1A-1D, a vehicle V may include an interior I with a component shown as floor console FC comprising a base B and a cover shown as armrest AR covering a storage compartment of floor console FC. Cover/armrest AR may be configured to move between a closed position and an open position to facilitate access to the storage compartment.

Figure 1A:
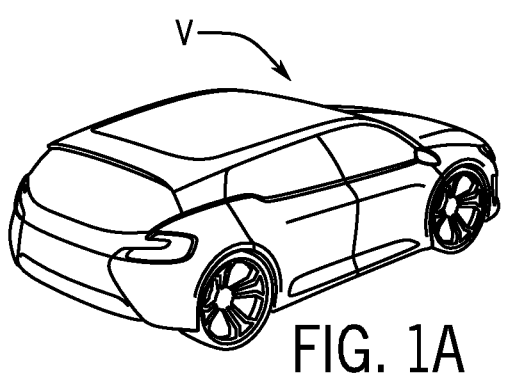
FIG. 1A is a schematic perspective view of a vehicle according to an exemplary embodiment.
Figure 1B:
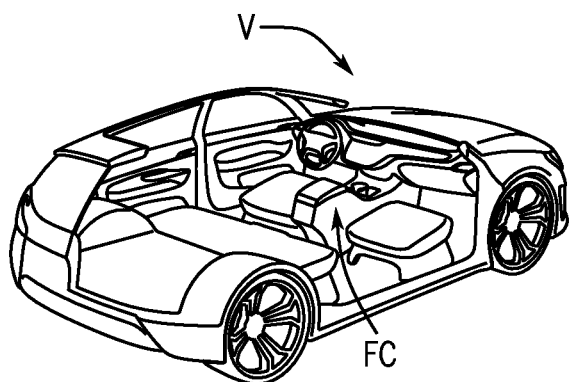
FIGS. 1B to 1C are schematic partial perspective views of a vehicle interior according to an exemplary embodiment.
Figure 1C:
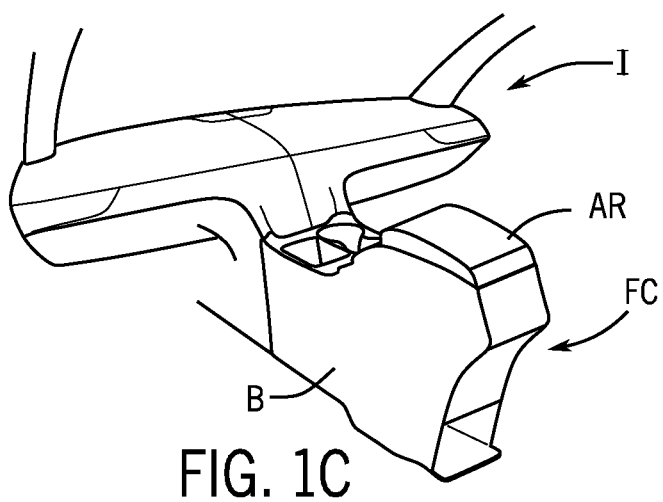
Figure 1D:
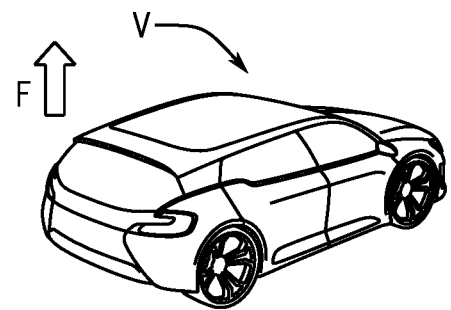
FIG. 1D is a schematic perspective view of a vehicle according to an exemplary embodiment.

As indicated schematically in FIGS. 1A-1B and 1D, the vehicle V may be subjected to an event in which an external force shown representationally as force F operates upon the vehicle as well as upon occupants, components and contents within the vehicle interior I. As indicated schematically in FIG. 1D, the event providing external force F may be any of a variety of types, e.g. collision, bump, roll-over, etc. As indicated schematically in FIGS. 2A-2B, 3A-3B, 4A-4B and 5A-5B, the external force F experienced during the event may act upon interior components such as the console. As indicated schematically in FIGS. 1C, 2A-2B, 3A-3B, 4A-4B and 5A-5B, the component may comprise a console C/FC providing a storage compartment in a base B/Bx with a cover T/Tx providing an armrest AR movable relative to the base B/Bx to provide access to the storage compartment (which may contain objects, items, articles, etc.).

Figure 2A:
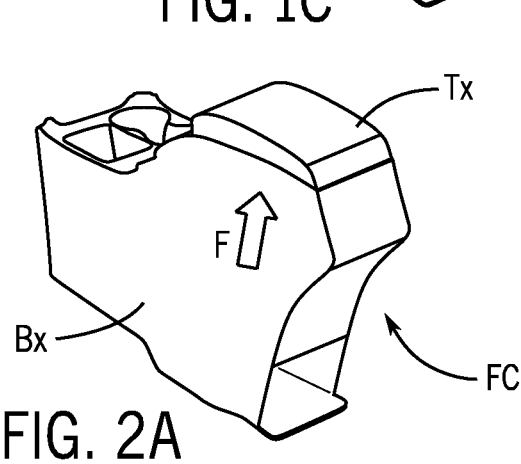
FIGS. 2A to 2B are schematic perspective views of a conventional vehicle interior component shown as a console assembly according to an exemplary embodiment.
Figure 2B:
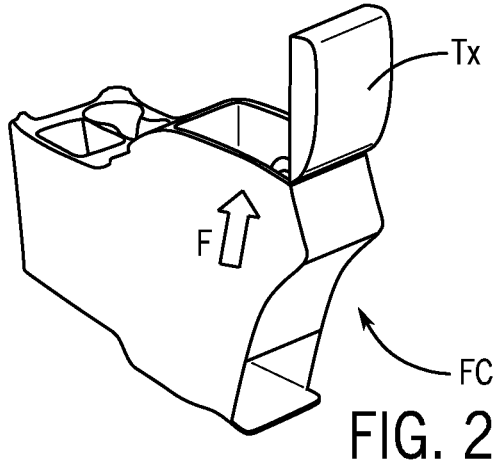
Figure 4A:
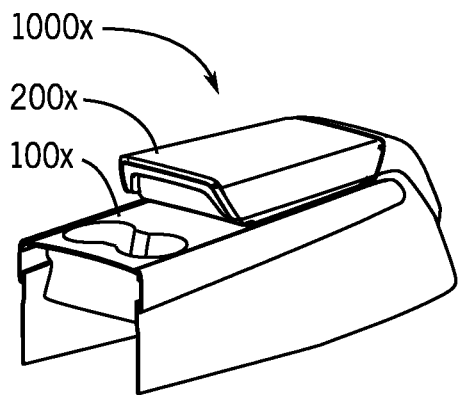
FIGS. 4A to 4B are schematic perspective views of a conventional vehicle interior component shown as a console assembly according to an exemplary embodiment.
Figure 4B:
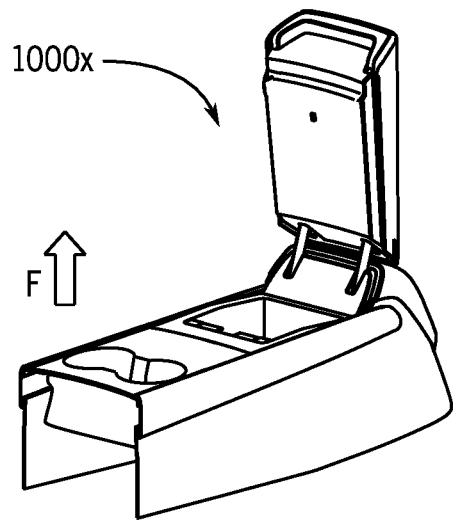

As indicated schematically in FIGS. 2A-2B and 4A-4B, a conventional vehicle interior component may comprise a console FC/$1000x$ with cover Tx/$200x$ moveable relative to a base Bx/$100x$. As indicated in FIGS. 2A and 4A, the cover Tx/$200x$ may be in a closed position relative to the base Bx/$100x$ when an event is experienced in which an external force F is applied (i.e. an external force above a threshold level); as indicated in FIGS. 2B and 4B, the effect of the force F may be to cause the cover Tx/$200x$ to come to an open position relative to the base $100x$. See also FIG. 1D. (As indicated schematically, the conventional vehicle interior component such as shown in FIGS. 2A-2B and 4A-4B may further comprise a mechanism or device such as a catch, magnet arrangement, friction/hinge bearing, etc. to retain/secure the cover in the closed position relative to the base in ordinary use.)

Figure 3A:
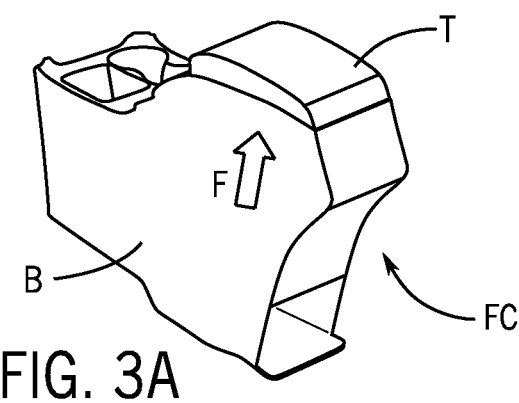
FIGS. 3A to 3B are schematic perspective views of a vehicle interior component shown as a console assembly according to an exemplary embodiment.
Figure 3B:
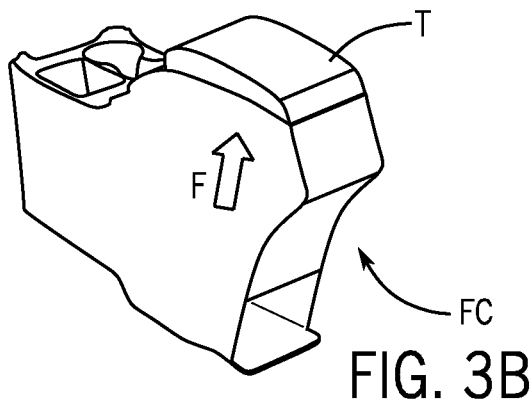
Figure 5A:
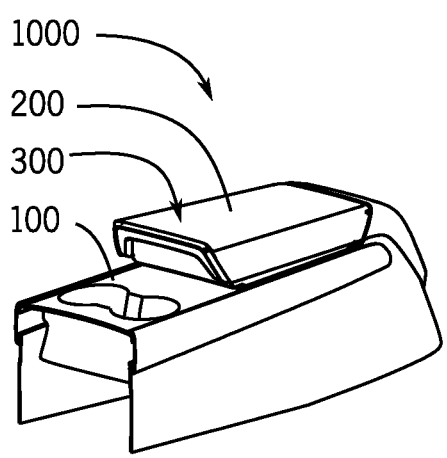
FIGS. 5A to 5B are schematic perspective views of a vehicle interior component shown as a console assembly according to an exemplary embodiment.
Figure 5B:
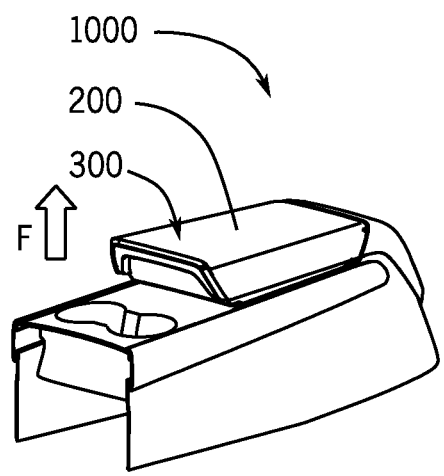

As indicated schematically according to an exemplary embodiment in FIGS. 3A-3B and 5A-5B, a vehicle interior component may comprise a console FC/1000 with cover T/200 moveable relative to a base B/100 and a latch mechanism 300. See also FIGS. 6A and 6D. As indicated in FIGS. 3A and 5A, the cover T/200 may be in a closed position relative to the base B/100 when an event is experienced in which an external force F is applied (i.e. an external force above a threshold level); as indicated in FIGS. 3B and 5B, the effect of the force F will be to actuate latch mechanism 300 to retain the cover T/200 in a closed position to the base B/100. See also FIGS. 1D and 11A-11F.

As indicated schematically according to an exemplary embodiment in FIGS. 3A-3B, 5A-5B, 6A-6D and 7A, latch mechanism 300 of the component FC/1000 may be configured to secure the cover T/200 to the base B/100 under the effect of an external force F on the vehicle. See also FIGS. 1D and 11A-11D. According to an exemplary embodiment as shown in FIGS. 6B-6C, 7A-7B and 8A-8C, the cover 200 may comprise a top portion 202 and a base section 204; latch mechanism 300 for cover 200 may comprise a pivot/hinge shown as axle/pin 310p for a member shown as catch/arm configured as latch 310 and a counterweight 314 in a base/receptacle 310r with a torsion spring ST (e.g. to provide a biasing force as indicated in FIGS. 8A-8C); latch mechanism 300 may comprise flat/cantilever spring SC (e.g. to provide a holding/biasing force as indicated in FIGS. 7A and 8A-8C) and a magnet arrangement MP (e.g. set of magnets) configured to provide a magnetic force MF (e.g. magnetic repulsion such as with N/N magnet polarity/force as indicated schematically in FIGS. 7B and 9G-9H).

Figure 9A:
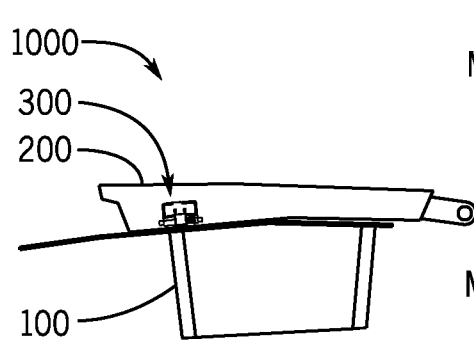
FIGS. 9A to 9C are schematic partial section views of a vehicle interior component shown as a console assembly according to an exemplary embodiment.
Figure 9D:
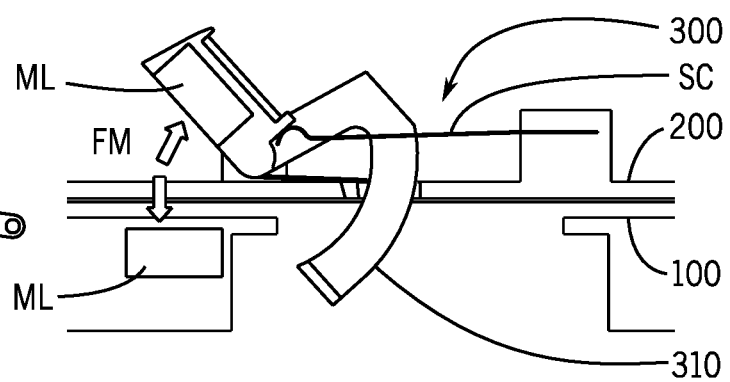
FIGS. 9D to 9F are schematic partial section views of a vehicle interior component shown as a console assembly according to an exemplary embodiment.
Figure 9B:
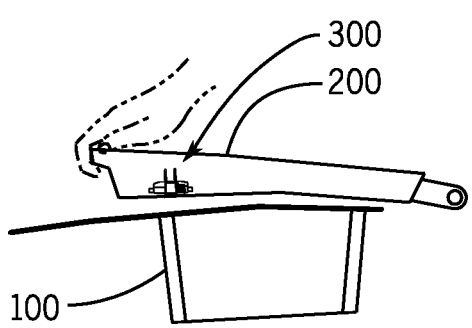
Figure 9E:
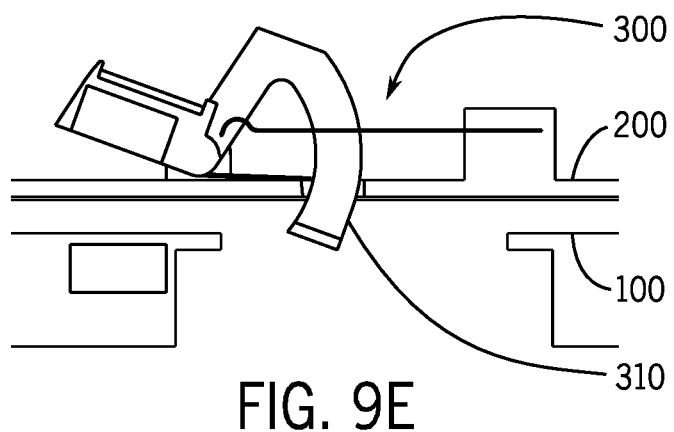
Figure 9C:
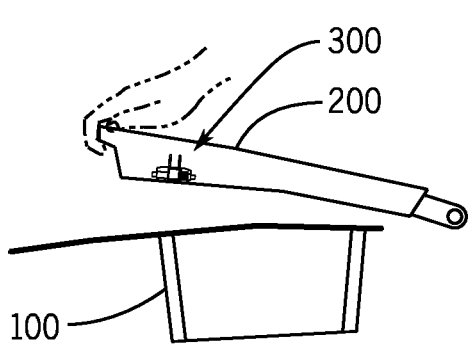
Figure 9F:
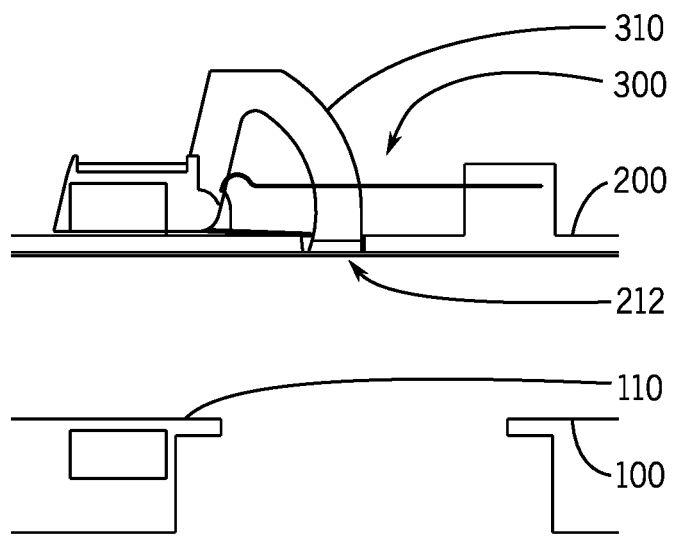
Figure 9G:
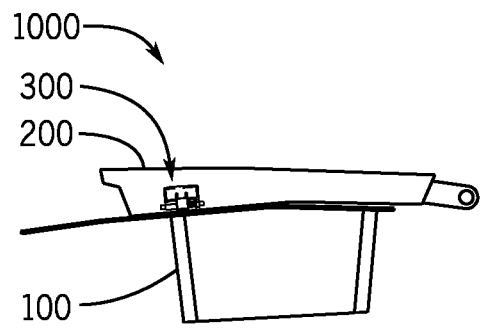
FIG. 9G is a schematic partial section view of a vehicle interior component shown as a console assembly according to an exemplary embodiment.
Figure 9H:
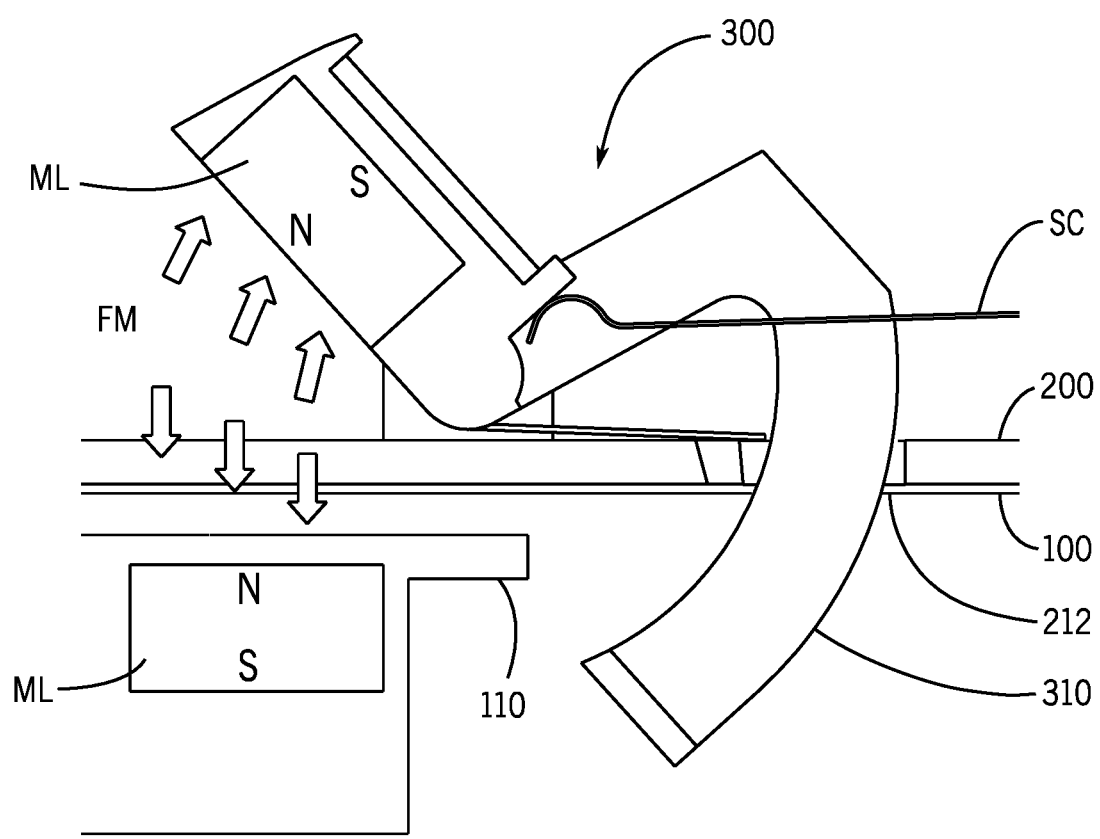
FIG. 9H is a schematic partial section view of a vehicle interior component shown as a console assembly according to an exemplary embodiment.
Figure 10A:
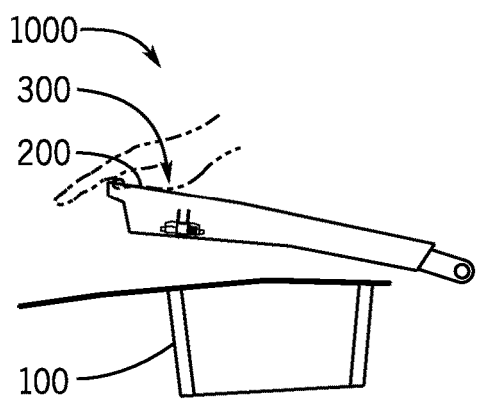
FIGS. 10A to 10C are schematic partial section views of a vehicle interior component shown as a console assembly according to an exemplary embodiment.
Figure 10B:
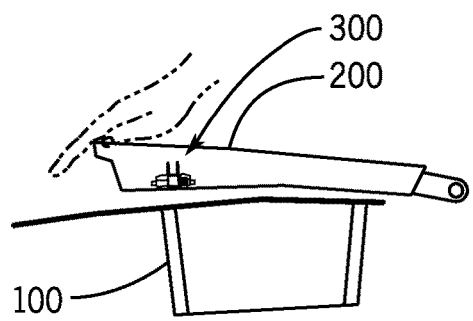
Figure 10C:
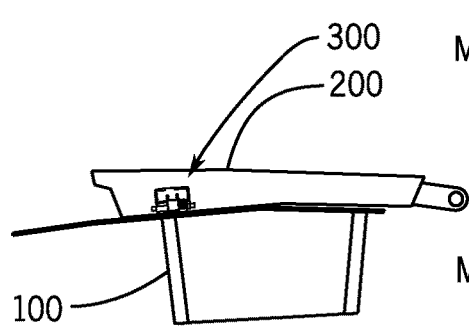
Figure 10D:
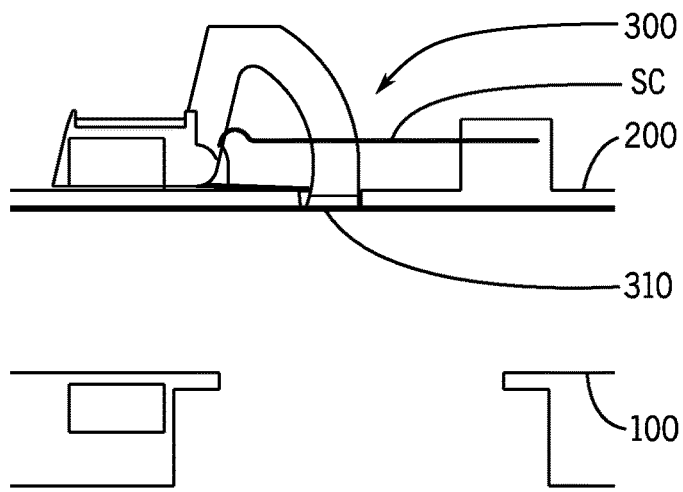
FIGS. 10D to 10F are schematic partial section views of a vehicle interior component shown as a console assembly according to an exemplary embodiment.
Figure 10E:
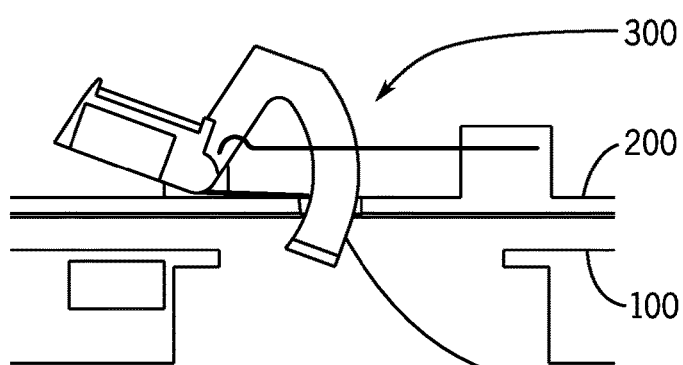
Figure 10F:
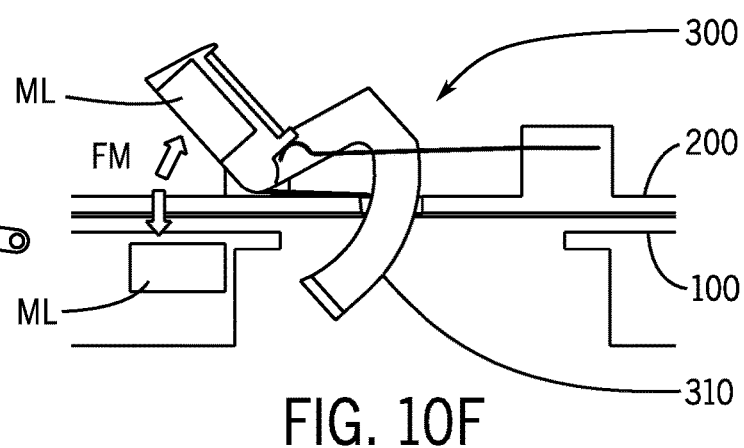
Figure 11A:
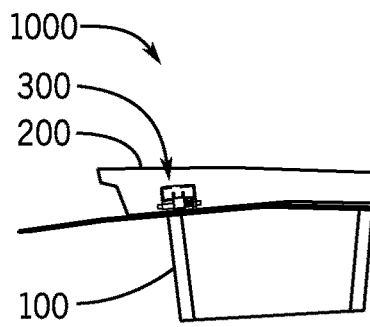
FIGS. 11A to 11C are schematic partial section views of a vehicle interior component shown as a console assembly according to an exemplary embodiment.
Figure 11B:
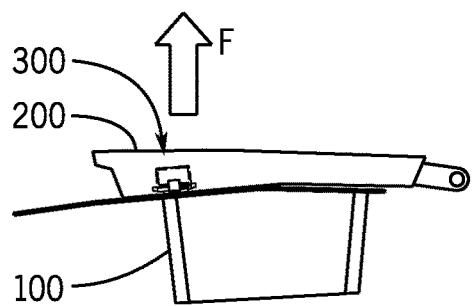
Figure 11C:
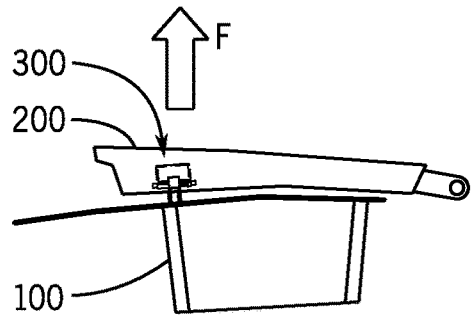
Figure 11D:
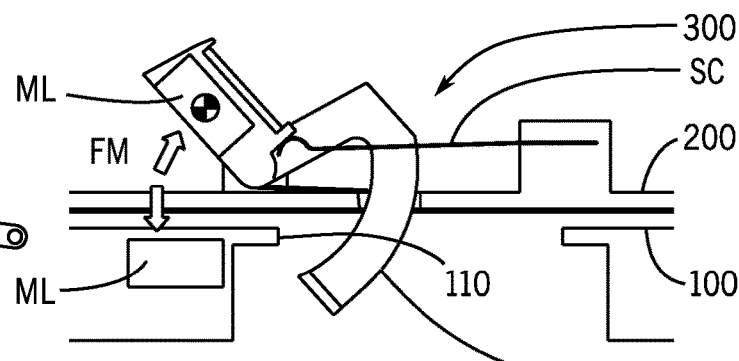
FIGS. 11D to 11F are schematic partial section views of a vehicle interior component shown as a console assembly according to an exemplary embodiment.
Figure 11E:
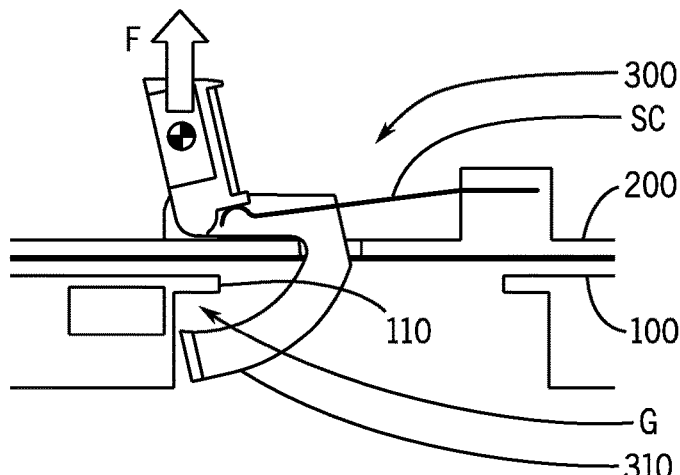
Figure 11F:
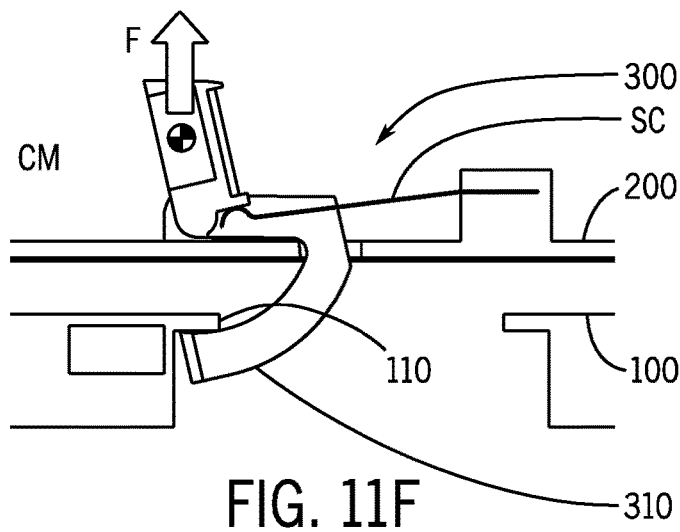
Figure 12A:
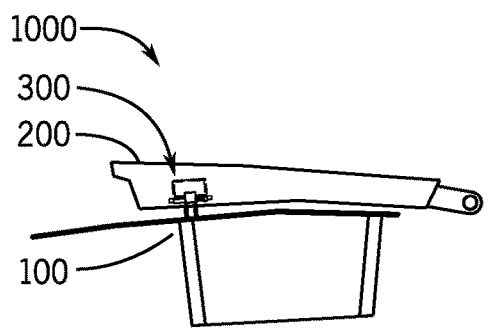
FIGS. 12A to 12C are schematic partial section views of a vehicle interior component shown as a console assembly according to an exemplary embodiment.
Figure 12B:
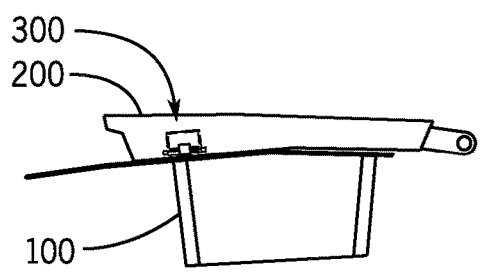
Figure 12C:
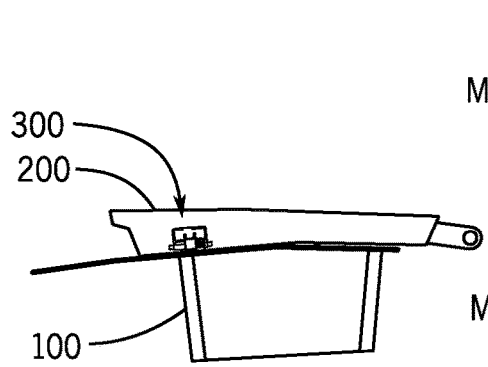
Figure 12D:
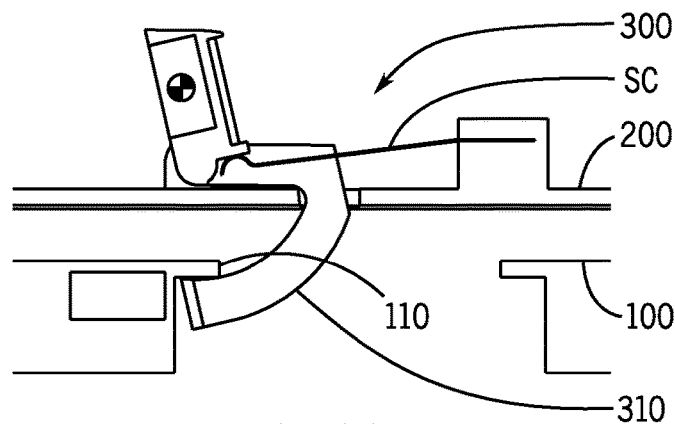
FIGS. 12D to 12F are schematic partial section views of a vehicle interior component shown as a console assembly according to an exemplary embodiment.
Figure 12E:
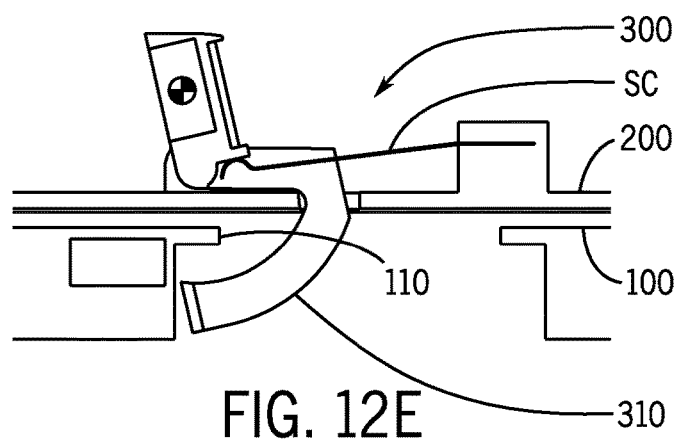
Figure 12F:
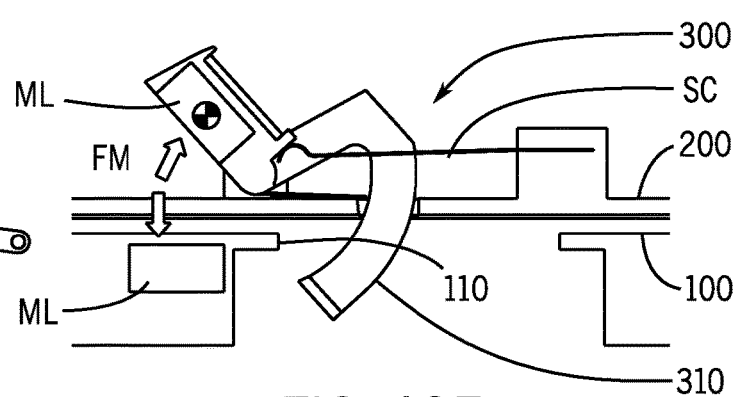

As indicated schematically in FIGS. 6B, 6D, 7A, 8A-8C, 9A-9H, 10A-10F, 11A-11F and 12A-12F, in operation of latch mechanism 300 the member shown as latch 310 may be configured for pivotal movement between a retracted position (e.g. disengaged and/or fully retracted/flush within opening 212 in the cover 200, see e.g. FIGS. 9F and 10D) and a partially extended/intermediate position and a fully extended position through opening 212 in cover 200 into base 100 (e.g. partially extended and/or fully extended for engagement with a catch shown as flange 110, compare FIGS. 9D-9E and 11E-11F). See also TABLES A through C.

As indicated schematically according to an exemplary embodiment in FIGS. 9A-9H and 10A-10F, in ordinary use (with no event applying an external force F beyond the threshold) latch mechanism 300 will remain in an unlatched state to allow to movement of the cover 200 between the closed position and the open position relative to the base 100 (e.g. as by manual closing/opening actuation by an occupant of the vehicle interior). See also TABLES A and B. As indicated schematically in FIGS. 9A-9B, 9D-9E, 9G-9H, 10B-10C and 10E-10F, in ordinary use latch mechanism 300 may be configured by operation of spring ST and counterweight and spring SC and magnetic force MF at magnet arrangement ML to provide latch 310 in the partially/extended position when cover 200 is in the closed position relative to base 100. See also TABLE B and FIGS. 7A-7B and 8A-8C. As indicated schematically in FIGS. 9C, 9F, 10A and 10D, in ordinary use the latch mechanism may be configured by operation of spring ST and counterweight and spring SC to provide arm/catch in the retracted position when the cover 200 is in the open position relative to base 100. See also TABLE A and FIGS. 6D, 7A-7B and 8A-8C. As indicated schematically according to an exemplary embodiment in FIGS. 6B, 6D, 7A-7B and 8A, the component may comprise a mechanism shown as magnet arrangement MC (e.g. set of magnets) configured to retain/secure the cover in the closed position relative to the base in ordinary use (e.g. by net magnetic attraction with S/N magnet polarity/force as indicated schematically in FIG. 7B). See also FIG. 1C.

As indicated schematically according to an exemplary embodiment in FIGS. 11A-11F and 12A-12D, with the cover 200 in the closed position relative to the base 100 upon an event applying an external force F (beyond the threshold force indicated as acting upon the mass shown representationally with a center of mass CM) latch mechanism 300 will be moved into a latched state (e.g. with latch arm/member 310 fully extended through cover 200 to be engaged by a plate/flange shown as catch 110 of base 100) to retain the cover 200 in the closed position relative to the base 100 (and to prevent movement of the cover 200 to the open position relative to the base 100). See also FIGS. 1D, 3B, 5B and TABLES A and B.

As indicated schematically in FIGS. 11A-11F, the external force F acting upon the mass CM against the spring SC engages latch mechanism 300 into the latched state by movement of latch 310 from the cover 200 from the intermediate position (FIG. 11D) into the fully-extended position (FIGS. 11E-11F) for engagement with the flange/catch 110 of the base. See also TABLE C. When the latch mechanism is in the latched state and the cover is in a fully closed position relative to the base a gap G may be provided between the flange/catch 110 and the end of latch 310 (see FIG. 11E); movement of the cover 200 to an open position relative to the base may be prevented by engagement of the end of latch 310 with the flange/catch 110 (see FIG. 11F).

As indicated schematically in FIGS. 12A-12F, after the event (with no external force above the threshold acting upon mass CM) latch mechanism 300 may be configured by operation of spring ST and counterweight and spring SC and magnetic force MF at magnet arrangement ML to return the latch mechanism to the unlatched state with latch/member 310 moved to disengage from the flange/catch 110 and into the partially extended/intermediate position (with cover 200 in the closed position relative to base 100 and able to be moved to the open position). See also TABLE C and FIGS. 7A-7B, 8A-8C, 9A-9F and 10A-10F.

According to an exemplary embodiment, a mode of cover opening operation for the component is indicated in TABLE A.

According to an exemplary embodiment, a mode of cover closing operation for the component is indicated in TABLE B.

According to an exemplary embodiment, a mode of latching a cover for the component in response to an external/inertia force is indicated in TABLE C.

TABLE A

COVER OPENING FUNCTION/OPERATION
(FIGS. 9A-9H and 10A-10F)

| Cover | Latch Mechanism | Set of Magnets | Torsion Spring | Cantilever Spring |
|---|---|---|---|---|
| Closed Position | Unlatched State (Latch in Intermediate Position) | Biases Latch against cantilever spring | Twisted by Magnetic Force of Set of Magnets | Provides a stop against Magnetic Force of Set of Magnets |
| Moving toward Open Position | Unlatched State (Latch moving toward Retracted Position) | Reducing magnetic force on Latch overcome by torsion spring | Rotating Latch toward retracted position | |
| Open Position | Unlatched State (Latch in Retracted Position) | | Holds Latch in Retracted Position | |

TABLE B

COVER CLOSING FUNCTION/OPERATION
(FIGS. 9A-9H and 10A-10F)

| Cover | Latch Mechanism | Set of Magnets | Torsion Spring | Cantilever Spring |
|---|---|---|---|---|
| Open Position | Unlatched State (Latch in Retracted Position) | | Holds Latch in Retracted Position | |
| Moving toward Closed Position/ Near Closed Position | Unlatched State (Latch moving toward Intermediate Position) | Increasing magnetic force on Latch overcomes torsion spring | Twisting by Magnetic Force of Set of Magnets | |
| Closed Position | Unlatched State (Latch in Intermediate Position) | Biases Latch against cantilever spring | Twisted by Magnetic Force of Set of Magnets | Provides a stop against Magnetic Force of Set of Magnets |

TABLE C

COVER LATCHING FUNCTION/OPERATION
(FIGS. 11A-11F and 12A-12F)

| Cover | Latch Mechanism | Set of Magnets | Cantilever Spring | Mass of Latch Assembly |
|---|---|---|---|---|
| Closed Position | Unlatched State (Latch in Intermediate Position) | Biases Latch against cantilever spring | Provides a stop against Magnetic Force of Set of Magnets | |
| Moving toward Latched Position | Latch Moving toward Fully Extended Position | | Deflected by Inertia Force on Mass | Inertia Force acts on Mass to deflect Cantilever Spring and move Latch toward Fully Extended Position |
| Latched Position | Latched State (Latch in Fully Extended Position; Engaged with Flange of Base to Block Opening of Cover) | | Deflected by Inertia Force on Mass | Inertia Force acts on Mass to deflect Cantilever Spring and move Latch into engagement with Base |

EXEMPLARY EMBODIMENTS

As shown schematically according to an exemplary embodiment in FIGS. 2A and 2B, a conventional floor console may comprise a cover Tx covering a storage compartment SC. An external force F may be applied to cover Tx, for example when the vehicle is subjected to a rollover. Conventional cover Tx may move from a closed position to an open position as a result of the application of force F.

As shown schematically according to an exemplary embodiment in FIGS. 3A and 3B, a floor console may comprise a cover T covering a storage compartment. An external force F may be applied to cover T. Cover T may be held in a closed position in response to application of force F of a predetermined amount.

As shown schematically according to an exemplary embodiment in FIGS. 4A and 4B, a conventional vehicle interior component shown as a floor console 1000x may comprise a cover Tx/200x covering a bin or storage compartment SC. An external force F may be applied to cover 200x, for example when the vehicle rolls over. Cover 200x may move from a closed position as shown schematically in FIG. 4A to an open position as shown schematically in FIG. 4B as a result of the application of force F exceeding a predetermined amount.

As shown schematically according to an exemplary embodiment in FIGS. 5A and 5B, a vehicle interior component 1000 shown as a floor console may comprise a base 100 and a cover 200 shown as an armrest covering a bin or storage compartment. An external force F may be applied to cover 200, for example when the vehicle rolls over. Cover 200 may be held in a closed position in response to application of force F of a predetermined amount. Cover 200 may be configured to move from a closed position as shown in FIG. 5A to an open position in response to application of an opening force. Cover 200 may be configured for adjustment from an unlatched state covering the bin as shown schematically in FIG. 5A to an open state uncovering the bin. Cover 200 may be configured for adjustment from the unlatched state to a latched state covering the bin as shown schematically in FIG. 5B in response to a force exceeding a predetermined amount.

Figure 6A:
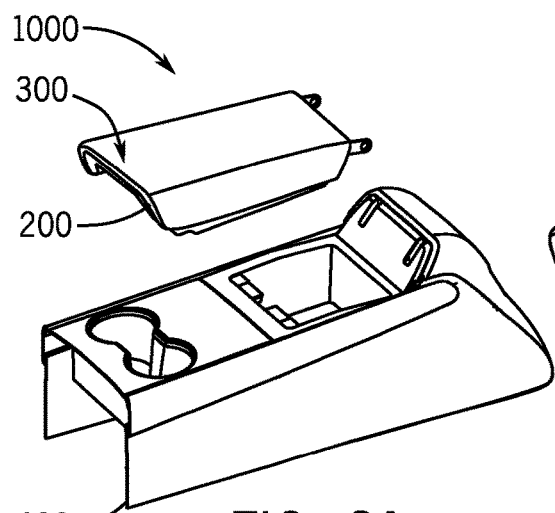
FIGS. 6A to 6B are schematic exploded perspective views of a vehicle interior component shown as a console assembly according to an exemplary embodiment.
Figure 6B:
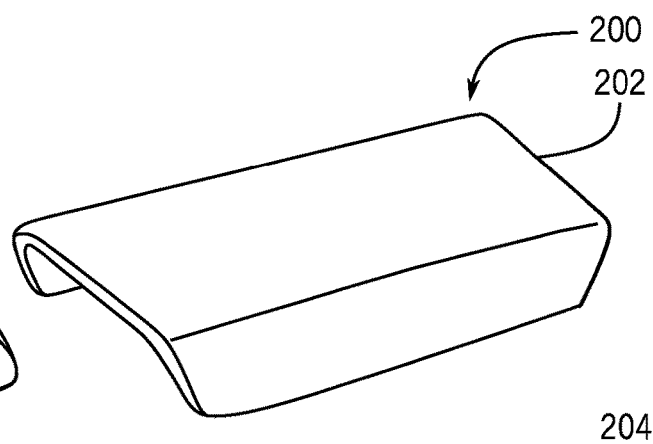
Figure 6D:
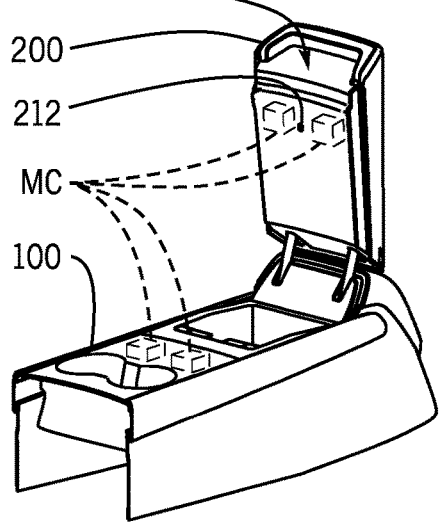
FIG. 6D is a schematic perspective view of a vehicle interior component shown as a console assembly according to an exemplary embodiment.
Figure 6C:
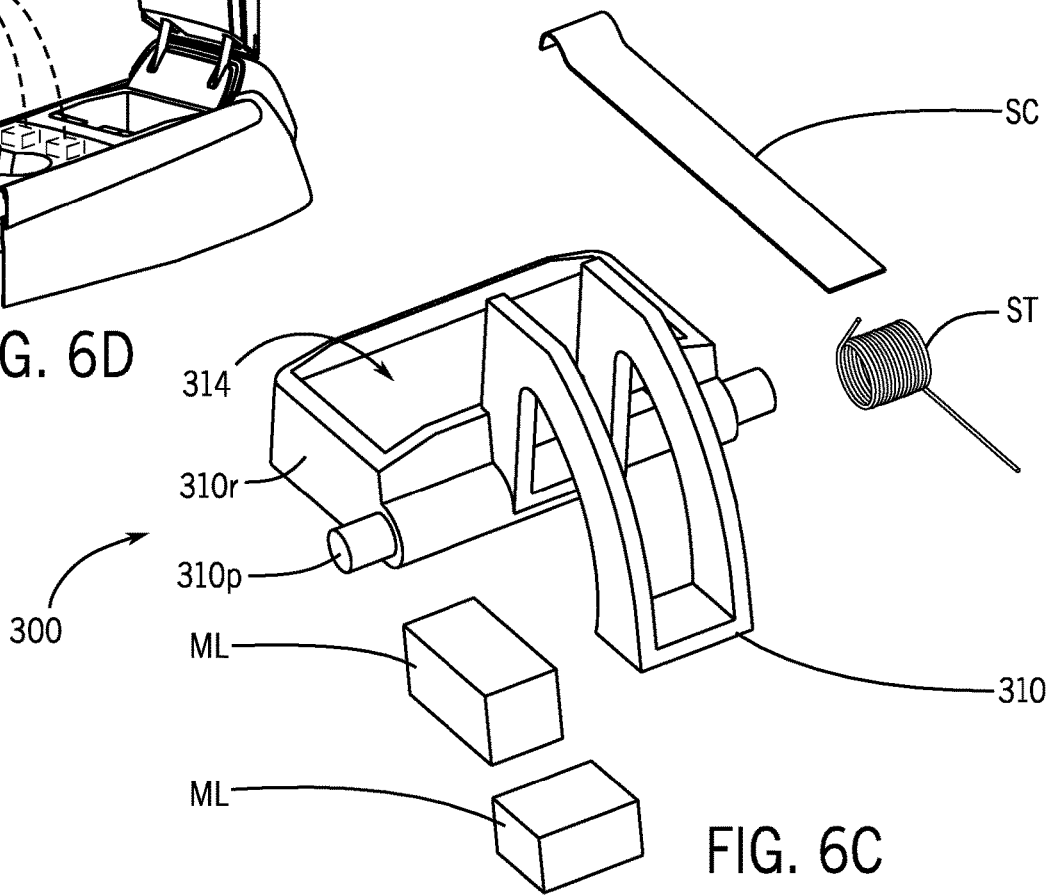
FIG. 6C is a schematic exploded perspective view of a cover and a mechanism of a vehicle interior component according to an exemplary embodiment.
Figure 7A:
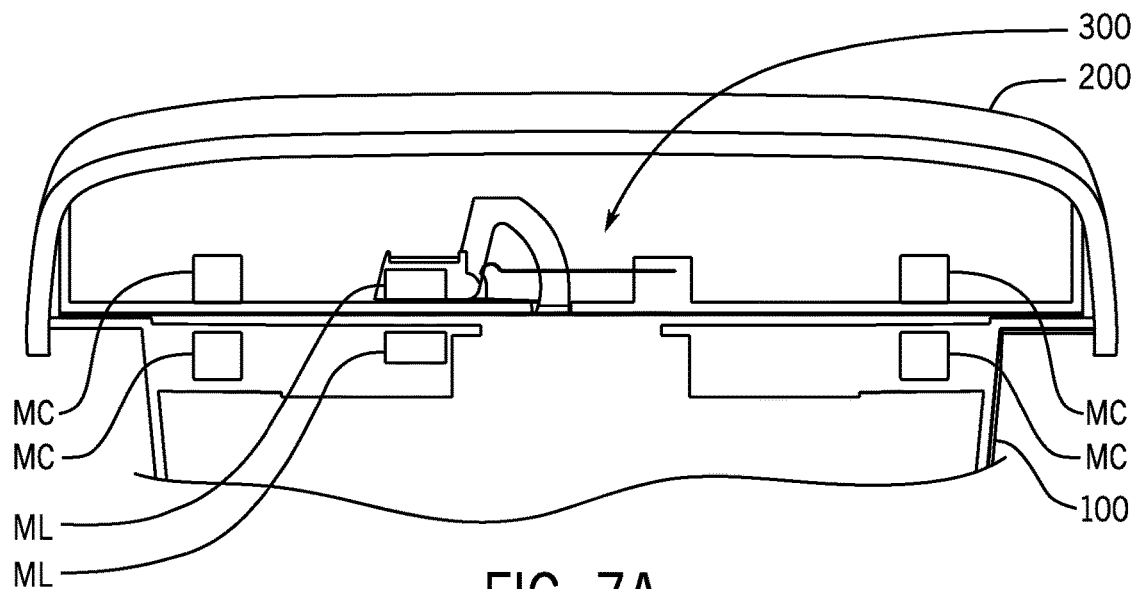
FIG. 7A is a schematic partial section view of a vehicle interior component shown as a console assembly according to an exemplary embodiment.
Figure 7B:
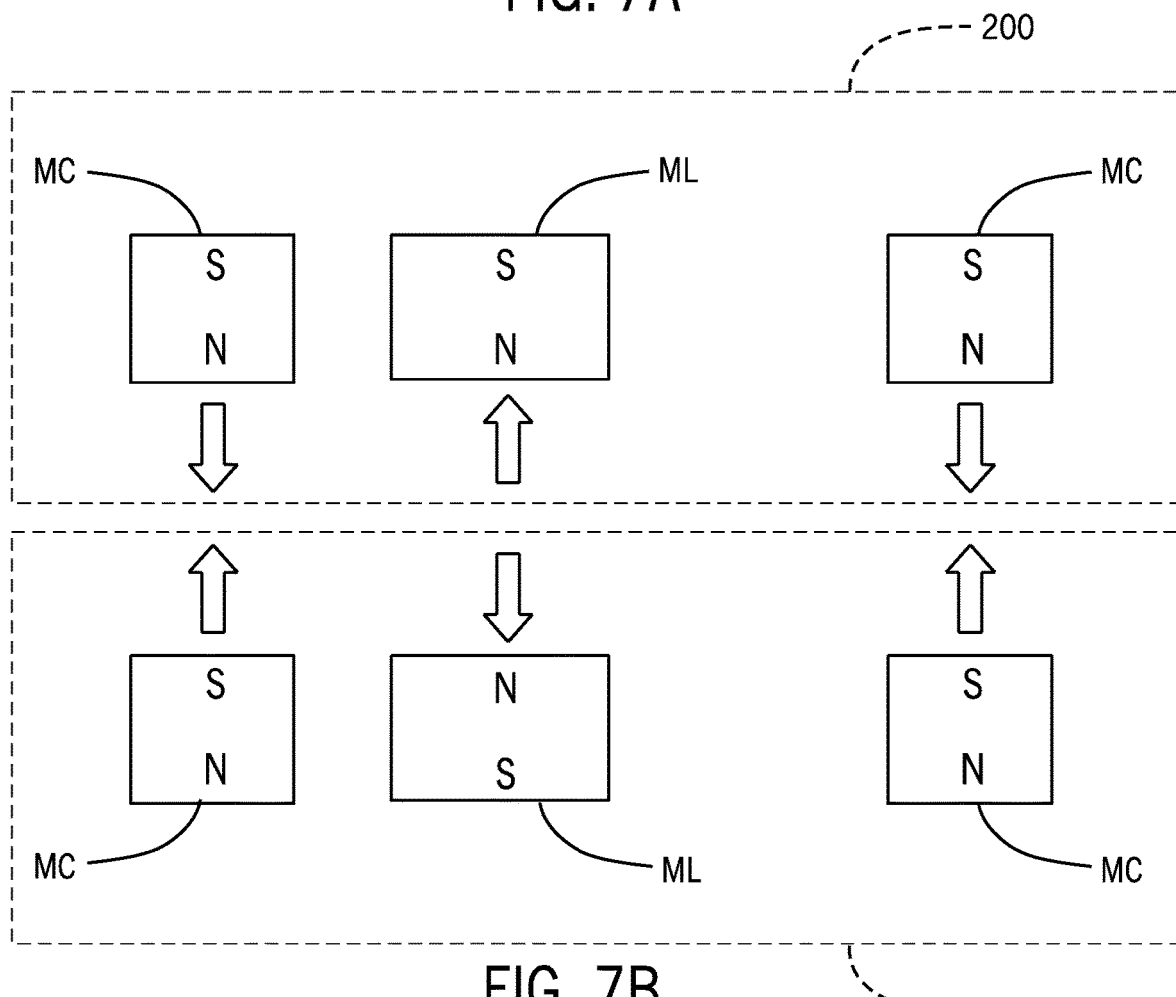
FIG. 7B is a schematic partial section view of a magnet arrangement for a vehicle interior component according to an exemplary embodiment.

As shown schematically according to an exemplary embodiment in FIGS. 6A-6C, vehicle interior component 1000 may comprise a base 100, a cover 200 and a latch mechanism 300. Base 100 may comprise a bin or storage compartment 102. Cover 200 may comprise a top portion 202 and a base portion 204. Latch mechanism 300 may comprise a latch 310, a spring ST shown as a torsion spring, a spring SC shown as a cantilever spring and a counterweight 314. Cover 200 may comprise latch mechanism 300. Counterweight 314 may be coupled to latch 310; latch 310 may comprise a receptacle or holder 310r configured to receive counterweight 314. Counterweight 314 and latch 310 may be coupled in order to move together relative to cover 200 and base 100. Base portion 204 of cover 200 may comprise a feature to receive latch 310 and guide rotation of latch 310 relative to cover 200; latch 310 may comprise a pin 310p configured to rotate relative to base portion 204 of cover 200. Spring SC may be configured to deflect to allow rotation of latch 310. Spring SC may be configured to provide a stop for latch 310. Cover 200 may comprise latch mechanism 300. Spring ST may be configured to rotate latch 310. Latch mechanism 300 may be assembled to base portion 204 of cover 200 and covered by top portion 202 of cover 200.

Referring to FIGS. 1A-1D, 2A-2B, 3A-3B, 4A-4B and 5A-5B, a component 1000/1000x for an interior of a vehicle V of a type that may be subjected to an external force F in an event such as a rollover of the vehicle V. As shown in FIGS. 6A-6D, the component may comprise a cover 200 movable between a closed position and an open position relative to the base 100 and a latch mechanism 300 configured to provide a latched state to secure the cover in the closed position relative to the base; when the vehicle is subjected to the external force F the latch mechanism may be configured to actuate to the latched state to secure the cover in the closed position relative to the base, as indicated schematically in FIGS. 3B and 5B. As shown schematically in FIGS. 6A-6D and 8A-8C, latch mechanism 300 may comprise a latch 310 in the cover; the latch may be configured to be retracted when the cover is in the open position; the latch may be configured to be partially extended when the cover is in the closed position. See FIGS. 9A-9F and 10A-10F and TABLES A and B. The latch mechanism may comprise the latch shown as a latch/member 310 in the cover and a catch in the base; the catch in the base may comprise a plate shown as a flange/catch 110; latch 310 of latch mechanism 300 may be configured to provide a gap G with the plate/catch 110 in the latched state. See FIG. 11E. The latch mechanism may comprise a latch configured to provide a retracted position and an extended position. See FIGS. 11A-11F and 12A-12F and TABLE C.

As indicated schematically in FIGS. 3B, 5B and 11A-11D, upon the event (with external force F above a threshold force) for the vehicle when the cover is in the closed position latch 310 of latch mechanism 300 may be actuated to the extended position. See also TABLE C.

As indicated schematically in FIGS. 9A-9F and 10A-10F, latch mechanism 300 may be configured to move latch 310 to the retracted position when the cover is moved toward the open position; latch 310 may be configured with an intermediate position between the extended position and the retracted position; the latch may be partially extended from the cover when in the intermediate position. See TABLES A and B.

According to an exemplary embodiment as shown schematically in FIGS. 9A-9F and 10A-10F, when the cover is in the closed position latch 310 may be in the intermediate position; when the latch is in the intermediate position the cover may be moved toward the open position relative to the base; the latch may be configured to move to the intermediate position when the cover is moved to the closed position; the latch may be configured to rotate into the intermediate position when the cover is moved to the closed position.

According to an exemplary embodiment as shown schematically in FIGS. 6A-6D and 8A-8C, latch mechanism 300 of the component may comprise a spring arrangement; the latch may be configured to move to the intermediate position by operation of the spring arrangement; the spring arrangement may comprise a torsion spring ST and/or a flat/cantilever spring SC. According to an exemplary embodiment as shown schematically in FIGS. 7A-7B and 8A-8C, latch mechanism 300 may comprise a magnet arrangement ML; the magnet arrangement may comprise a magnet in the base and a magnet in the cover; the magnet in the base may be configured to provide magnetic repulsion to the magnet in the cover; the magnet arrangement may be configured to retain a latch of the latch mechanism in an intermediate position between a retracted position and an extended position; the magnet arrangement may be configured to move the latch toward a retracted position. See also FIGS. 9G-9H and TABLES A and B.

According to an exemplary embodiment shown schematically in FIGS. 6A-6D, 7A and 8A-8C, latch mechanism 300 may comprise a counterweight 314; the latch mechanism may be configured to actuate from an unlatched state to the latched state when the event for the vehicle provides an inertia force on the counterweight. See FIGS. 3B, 5B, 11A-11F and TABLE C. According to an exemplary embodiment, the latch mechanism may comprise a latch and the spring arrangement configured to move the latch toward a retracted position; the spring arrangement may be configured to move the latch to the retracted position when the cover is moved from the closed position toward the open position; the spring arrangement may comprise a torsion spring ST. According to an exemplary embodiment, the latch mechanism may comprise a magnet arrangement ML configured to compress the torsion spring; the latch mechanism may comprise a latch and a spring configured to move the latch to an intermediate position between an extended position and a retracted position. The component may comprise a magnet arrangement ML configured to bias the latch against the spring arrangement; the spring arrangement may comprise a stop for the magnet arrangement; the spring arrangement may comprise a flat/cantilever spring SC. According to an exemplary embodiment, the spring/spring arrangement may comprise at least one of (a) a beam spring; (b) a cantilever spring; (c) a stop; (d) a cam surface configured to engage a cam surface for the latch. See e.g. FIGS. 8A-8C.

Referring to FIGS. 1A-1D, 2A-2B, 3A-3B, 4A-4B and 5A-5B, a vehicle interior component may comprise a base, a cover configured to move relative to the base between a closed position and an open position and a latch mechanism configured to provide an unlatched state for the cover and a latched state for the cover. See also FIGS. 9A-9F, 10A-10F, 11A-11F, 12A-12F and TABLES A, B and C. According to an exemplary embodiment shown schematically in FIGS. 7A, 8A-8C, 11A-11F and 12A-12F, the latch mechanism may be configured to provide the latched state when actuated by an inertia force. The cover may comprise the latch mechanism. The latch mechanism may be configured to extend from the cover when the cover is in the closed position. According to an exemplary embodiment shown schematically in FIGS. 6A-6D and 8A-8C, the cover may comprise a wall comprising an opening; the latch mechanism may be configured to form a generally continuous surface with the wall of the cover when the cover is in the open position. The cover may comprise a wall comprising an opening; the latch mechanism may be configured to protrude through the opening of the wall of the cover when the cover is in the closed position. The latch mechanism may be configured to rotate relative to the base to engage the base. The cover may be configured to rotate in an opening direction relative to the base between the closed position and the open position; the latch mechanism may be configured to rotate relative to the base in a direction generally orthogonal to the opening direction. See also FIGS. 6D, 7A, 9A-9H and 10A-10D. According to an exemplary embodiment shown schematically in FIGS. 11A-11F and 12A-12F, the latch mechanism may comprise a bar configured to engage the base in the latched state. The bar of the latch mechanism may be configured to engage a flange of the base in the latched state; the bar of the latch mechanism may be configured to rotate into engagement with the base in the latched state. See FIGS. 6A-6D, 8A-8C and TABLE C. The component may comprise a counterweight configured to provide mass to move the bar toward engagement with the base. The component may comprise a spring mechanism configured to at least one of bias the bar in the unlatched state and move the bar in response to removal of the inertia force. See FIGS. 6A-6D and 8A-8C and TABLES A, B and C. According to an exemplary embodiment shown schematically in FIGS. 11A-11F, the bar of the latch mechanism may be configured to provide a gap with the base in the latched state; the gap may be configured to be closed to prevent the cover from moving to the open position. According to an exemplary embodiment shown schematically in FIGS. 11A-11F and 12A-12F, the latch mechanism may comprise a latch configured to move between a retracted position and an extended position through an intermediate position; the latch may comprise a curved member configured to engage the base in the latched state; the latch may be configured to move from the intermediate position toward the retracted position when the cover moves from the closed position toward the open position; the latch may be configured to move from the intermediate position toward the extended position in response to the inertia force. The cover may be configured for movement from (a) the unlatched state with the cover in the closed position and the latch in the intermediate position to (b) a transition state with the latch in the fully extended position to (c) the latched state with the cover in the closed position and the latch in the extended position. See also FIGS. 9A-9F, 10A-10F, 11A-11F, 12A-12F and TABLES A, B and C. The component may comprise a gap between the latch mechanism and the base in the transition state; the cover may be configured to move through the gap to contact the base in the latched state; the cover may be configured to pivot relative to the base between the closed position and the open position. See also FIGS. 11A-11F and TABLE C.

According to an exemplary embodiment shown schematically in FIGS. 1B and 1C, the component may comprise at least one of (a) a console; (b) a center console; (c) a floor console; (d) an armrest.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior comprising:
   (a) a base;
   (b) a cover configured to move relative to the base between a closed position and an open position;
   (c) a latch mechanism configured to provide an unlatched state for the cover and a latched state for the cover; and
   (d) a spring mechanism;
   wherein the latch mechanism is configured to provide the latched state when actuated by an inertia force;
   wherein the latch mechanism comprises a latch configured to move between a retracted position and an extended position through an intermediate position;
   wherein the latch is configured to move from the intermediate position toward the retracted position when the cover moves from the closed position toward the open position;
   wherein the latch mechanism is configured to move from the unlatched state to the latched state when actuated by the inertia force;
   wherein the spring mechanism is configured to bias the latch mechanism in the unlatched state.

2. The component of claim 1 wherein the latch comprises a curved member configured to engage the base in the latched state.

3. The component of claim 1 wherein the latch is configured to move from the intermediate position toward the extended position in response to the inertia force.

4. The component of claim 1 wherein the cover is configured for movement from (a) the closed position with the latch in the intermediate position to (b) a transition state with the latch in the extended position to (c) the closed position with the latch in the extended position.

5. The component of claim 4 wherein the latch mechanism is configured to provide a gap with the base in the transition state.

6. The component of claim 1 wherein the component comprises at least one of (a) a console; (b) a center console; (c) a floor console; (d) an armrest.

7. The component of claim 1 wherein the cover comprises a wall comprising an opening;
   wherein the latch mechanism is configured to protrude through the opening of the wall of the cover when the cover is in the closed position.

8. The component of claim 1 wherein the cover comprises the latch mechanism.

9. The component of claim 1 wherein the latch mechanism is configured to extend from the cover when the cover is in the closed position.

10. The component of claim 1 wherein the cover comprises a wall comprising an opening; wherein the latch mechanism is configured to form a surface with the wall of the cover when the cover is in the open position.

11. The component of claim 1 wherein the latch mechanism is configured to rotate relative to the base to engage the base.

12. The component of claim 1 wherein the latch mechanism comprises a bar configured to rotate into engagement with the base in the latched state.

13. The component of claim 1 wherein the cover is configured to rotate in an opening direction relative to the base between the closed position and the open position;
   wherein the latch mechanism is configured to rotate relative to the cover when actuated by the inertia force.

14. The component of claim 1 wherein the latch mechanism comprises a bar configured to engage the base in the latched state.

15. The component of claim 14 wherein the bar of the latch mechanism is configured to rotate into engagement with the base in the latched state.

16. The component of claim 14 further comprising a counterweight configured to provide mass to move the bar toward engagement with the base.

17. The component of claim 14 wherein the spring mechanism is configured to at least one of (a) bias the bar in the unlatched state; (b) move the bar in response to removal of the inertia force.

18. The component of claim 14 wherein the bar of the latch mechanism is configured to provide a gap with the base in the latched state.

19. The component of claim 18 wherein the latch mechanism is configured to close the gap to prevent the cover from moving to the open position.

* * * * *